United States Patent [19]

Centera

[11] 4,056,035

[45] Nov. 1, 1977

[54] STUD LOCK

[76] Inventor: Benny Centera, 1325 Wilder Ave., Honolulu, Hawaii 96822

[21] Appl. No.: 716,726

[22] Filed: Aug. 23, 1976

[51] Int. Cl.² ............................................. F16B 21/16
[52] U.S. Cl. ........................................ 85/8.9; 70/231; 70/232; 85/51; 403/165
[58] Field of Search ...................... 85/8.6, 8.9, 33, 51, 85/53, 56; 151/33, 41.7; 70/229, 230, 231, 232; 403/141, 143, 165; 248/203

[56] References Cited

U.S. PATENT DOCUMENTS

| | | | |
|---|---|---|---|
| 480,336 | 8/1892 | Monday | 85/8.9 X |
| 602,724 | 4/1898 | Butler | 85/8.8 |
| 690,396 | 1/1902 | Brown | 85/8.6 X |
| 691,477 | 1/1902 | Murphy | 85/8.8 |
| 1,284,300 | 11/1918 | Fuchs | 403/143 X |
| 1,764,367 | 6/1930 | Szymanski | 70/232 X |
| 1,777,614 | 10/1930 | Hauger | 85/51 |
| 2,676,509 | 4/1954 | Graham | 85/33 |
| 2,785,564 | 3/1917 | Rossi | 70/232 |
| 3,342,096 | 9/1967 | Bobrowski | 151/41.7 X |
| 3,641,848 | 2/1972 | Franks | 85/45 X |

FOREIGN PATENT DOCUMENTS 665,974  7/1964  Italy ........................................ 85/8.6

Primary Examiner—Roy D. Frazier
Assistant Examiner—Thomas J. Holko
Attorney, Agent, or Firm—A. Yates Dowell, Jr.

[57] ABSTRACT

Apparatus which is mounted on a stud to prevent stud supported articles from inadvertently slipping off of the studs as well as to resist theft of such articles. The apparatus includes a two-piece body which is selectively connected together and such body defines an enlarged interior opening for receiving a portion of the stud and an opening of reduced diameter encompassing another portion of the stud.

1 Claim, 7 Drawing Figures

STUD LOCK

BACKGROUND OF THE INVENTION

1. Field of the Invention

This invention relates generally to retaining members of various kinds and relates particularly to apparatus attachable to a stud for securing an article thereon.

2. Description of the Prior Art

Heretofore many efforts have been made to provide a locking mechanism for bolts, studs and the like which could be connected to the bolts or studs in such a manner as to permit freely rotatable movement but which limited relative axial movement. Many of these prior art devices have included a pair of separate body portions which are applied from opposite sides of a reduced portion of a fixed member, such as a bolt or stud, after which the body portions are connected together by fasteners with portions of the bolt or stud extending outwardly from opposite sides of the apparatus. Some examples of this type of structure are the Patent to Carpenter, U.S. Pat. No. 1,452,492 and the French Pat. to Picard French Patent No. 695,750.

Additionally bolt and stud locks have been provided in which the body included two or more pivotally connected portions which could be spread apart to permit a portion of a bolt or stud to be inserted and thereafter the portions of the body were swung toward closed position about the pivot and were either locked together or were provided with springs which urged the body portions toward closed position. Some examples of this type of structure are the patents to Butler, U.S. Pat. No. 602,724; Rossi, U.S. Pat. No. 2,785,564; and Hofmeister et al, U.S. Pat. No. 3,763,675.

Frequently decorative walls of a structure such as an elevator, stairwell, room, or the like are provided with hanging articles of various kinds including pads, mats, drapes, and the like which may be decorative as well as functional to protect the walls and to change the decor. Normally, in order to support the articles, a plurality of studs are connected to the walls adjacent to the ceiling and the articles to be hung have holes, eyelets, grommets or the like which receive the studs so that the studs support the weight of the hanging articles. Occasionally the hanging articles slip off of the studs so that the articles are unsightly and additionally the articles have been easily removable from the studs so that such articles have been easily stolen.

SUMMARY OF THE INVENTION

The present invention is embodied in an apparatus which can be attached to a stud having a head or a groove defining a reduced portion of the stem of the stud and such apparatus prevents accidental slipping of the hanging article from the stud and resists or delays the theft of such article. The apparatus includes a two-piece body defining an enlarged interior recess which receives the head or enlarged portion of a stud after which the body portions are secured together in a manner to resist ready removal thereof.

It is an object of the invention to provide an apparatus which can be easily applied to a stud and which prevents articles from slipping off of the studs.

Another object of the invention is to provide a stud lock having a two-piece body which can be connected together in a manner to be freely rotatable about the head of a stud but which has limited axial movement as well as a body which cannot be easily removed without the correct tools.

DESCRIPTION OF THE PREFERRED EMBODIMENT

Figure 1:
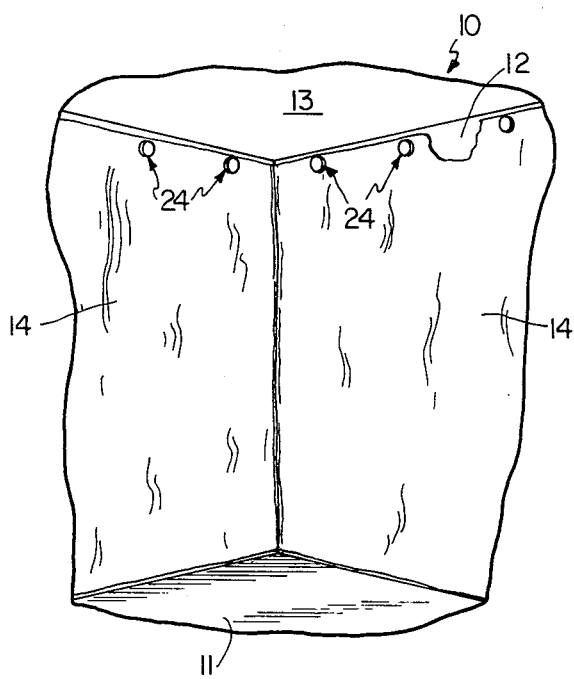
FIG. 1 is a perspective illustrating one application of the invention.
Figure 2:
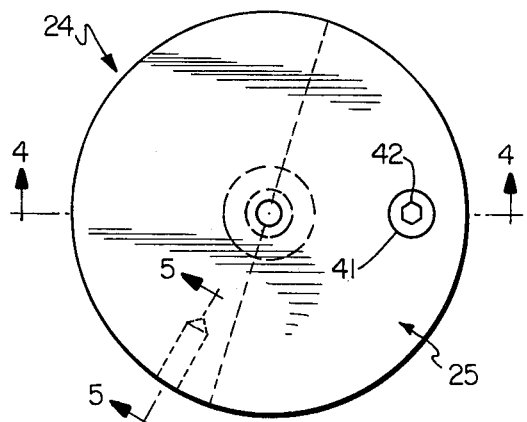
FIG. 2 is a top plan view of the invention per se.
Figure 3:
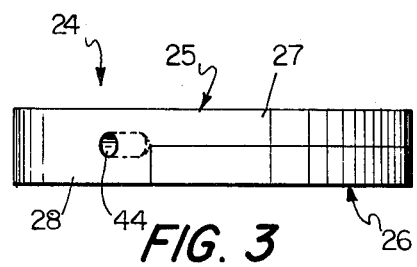
FIG. 3 is a side elevation thereof.
Figure 4:
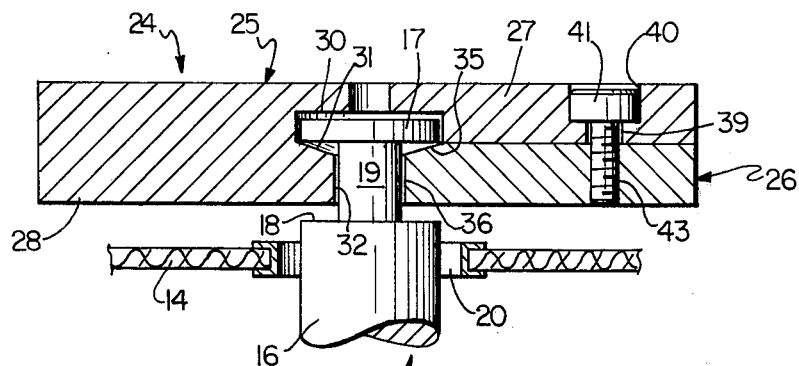
FIG. 4 is an enlarged vertical section on the line 4—4 of FIG. 2.

With continued reference to the drawing, a structure such as an elevator 10 includes a floor 11, upright walls 12, and a ceiling 13. In most office buildings the primary function of the elevator is to carry passengers between floors of the building; however, when one or more offices are being redesigned or when furniture is being moved in or out, it is necessary for the elevators to be used as freight elevators for carrying building supplies and furniture. When the elevator is to be used as a freight elevator, it is desirable to protect the walls by hanging mats or pads 14 along the walls and, in order to support such mats or pads, the elevators normally are provided with a plurality of studs 15 on the walls 12 adjacent to the ceiling 13.

Normally the studs include either a shank 16 which extends outwardly from the wall a short distance and terminates in an enlarged head 17 or, in some instances, the shank is provided with an annular groove 18 adjacent to the outer end which defines a reduced diameter portion 19. In this case the groove 18 is spaced inwardly from the outer end of the shank so that the outer end defines the head 17. The mats or pads 14 ordinarily have a plurality of openings, eyelets or grommets 20 which are spaced apart a distance corresponding to the spacing of the studs 15 and are of a size to receive and be supported by such studs. The structure thus far described is conventional in the prior art and forms no part of the present invention.

Figure 6:
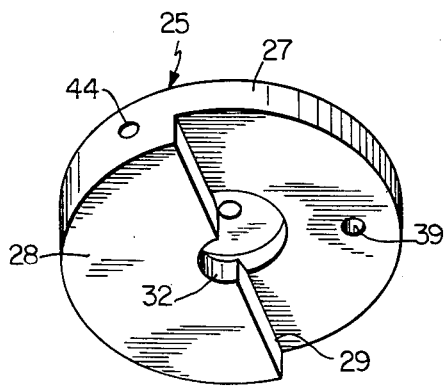
FIG. 6 is a bottom perspective of one of the body portions.
Figure 5:
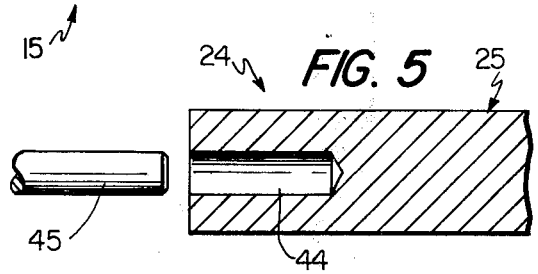
FIG. 5 is an enlarged fragmentary section on the line 5—5 of FIG. 2.

In order to prevent the articles from inadvertently slipping off of the studs 15, as well as to resist or delay unauthorized removal thereof, a stud lock 24 is provided for each of the studs. Each stud lock includes a first body member 25 and a second body member 26 which are joined together in use. As illustrated best in FIG. 6, the first body member includes a generally cylindrical outer portion 27 which is integrally connected to an inwardly extending semicylindrical portion 28 having a diametrically disposed shoulder 29. The outer portion 27 is provided with an enlarged internal recess 30 for the reception of the head 17 of the stud. The semicylindrical portion 28 has a semicircular inwardly tapered shoulder 31 which connects the recess 30 to a semicylindrical axial groove 32 of a size slightly larger than the reduced diameter portion 19 of the stud 15.

Figure 7:
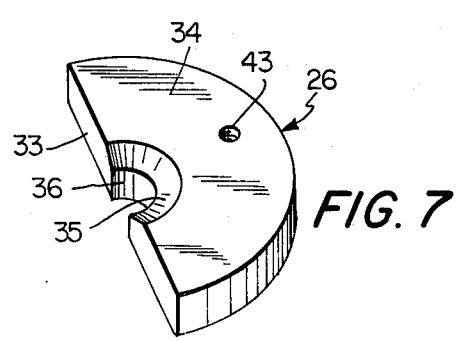
FIG. 7 is a top perspective of the other body portion.

With particular reference to FIG. 7, the second body member 26 is of generally semicylindrical configuration having a radius substantially equal to the radius of the first body member 25 and having a thickness substantially equal to the width of the diametrically disposed shoulder 29 of the first body member. The second body member has a diametrically disposed shoulder 33 which abuts the shoulder 29 of the first body member when the body members are in assembled relationship. The second body member includes a generally planar upper surface 34 which is adapted to cooperatively engage the outer portion 27 of the first body member to form a generally cylindrical stud lock.

The second body member includes a semicircular inwardly tapered shoulder 35 which connects the upper surface 34 to a semicylindrical axial groove 36 of a size slightly larger than the reduced diameter portion 19 of the stud. The axial groove 36 cooperates with the axial groove 32 to provide a bore which freely rotatably receives the reduced diameter portion 19 of the stud.

The outer portion 27 of the first body member is provided with a bore 39 and a counterbore 40 adjacent to the periphery thereof which slidably receive the shank and head of a cap screw 41 which preferably has a multi-sided recess or socket 42 for the reception of a conventional Allen wrench. The second body member 26 has a threaded opening 43 substantially in alignment with the bore 39 so that the cap screw 41 may be threadedly connected to the second body member. The cap screw 41 connects the first and second body members in assembled relationship after such body members have been applied to the stud 15. However, the use of an Allen wrench to tighten the cap screw tends to rotate the stud lock when torque is applied to the wrench since the stud lock is freely rotatably mounted on the stud.

In order to prevent rotation of the stud lock 24 when torque is applied, the first body member 25 is provided with a radially disposed opening 44 extending inwardly from the periphery. The opening 44 is adapted to receive a holding tool 45 which may be an elongated rod that extends outwardly from the periphery of the first body member so that the person using the Allen wrench may hold the tool 45 to prevent rotation of the stud lock and permit the cap screw 41 to be tightened securely.

The body members 25 and 26 may be constructed of any desired material such as metal or a synthetic organic polymeric thermoplastic resin such as acrilics, cellulosics, nylon, polyethylene, polyvinyl chloride, polystyrene or the like.

In the operation of the device, after the hanging articles are placed on the studs 15, the first body member 25 is moved into engagement with the stud 15 and at an angle of approximately 60° relative to the axis of such stud so that the head 17 is received within the recess 30. After the head is located within the recess 30, the first body member 25 is moved to a position generally normal to the axis of the stud and the second body member 26 is slipped behind the outer portion 27 of the first body member so that the shoulder 33 of the second body member is in abutting relationship with the shoulder 29 of the first body member. In this position the bore 39 of the first body member is substantially in alignment with the threaded opening 43 of the second body member so that the cap screw 41 can be inserted through the bore 39 to threadedly engage the opening 43. In order to securely tighten the cap screw, the holding tool 45 is inserted into the radially disposed opening 44 of the first body member to hold such body member in position while an Allen wrench is used to securely tighten the cap screw. When the holding tool 45 and the Allen wrench are removed the stud lock 24 is freely rotatably mounted on the outer end of the stud 15; however, any axial movement is limited to the play between the recess 30 and the head 17 of the stud. The stud lock is of a greater diameter than the openings through the grommets 20 of the hanging articles so that the hanging articles cannot inadvertently slip from the studs 15.

If an unauthorized person tries to remove the hanging article, he will need an Allen wrench of a size to fit the cap screw 41, as well as a holding tool 45 to prevent rotation of the stud lock 24 while the screw is being removed.

I claim:

1. A stud lock for retaining a hanging article on a stud having a generally flat disk shaped head and a stem having a reduced diameter, comprising, first and second body members which may be selectively connected together, said first body member including a generally cylindrical outer portion and an integral generally semicylindrical inner portion, said inner portion having a diametrically disposed shoulder, said outer portion including a cylindrical recess having a diameter greater than the diameter of the head of said stud and having a depth greater than the thickness of the head of said stud, said semicylindrical inner portion having a substantially semi-frusto-conical shoulder for guiding the head of said stud into said recess, said semicylindrical inner portion having an axially disposed semicylindrical groove extending from said semi-frusto-conical shoulder to the exterior surface of said inner portion, said second body member having a flat semicylindrical configuration with a diametrically disposed shoulder for complementary abutting relationship with the shoulder of said first body member, said second body member having an axially disposed semicylindrical groove, said semicylindrical grooves of said first and second members cooperating with each other to define a bore of a size to freely rotatably receive the stem of said stud, screw means for securing said first and second body members in assembled relationship with each other, and said first body member having a radially disposed opening for receiving a tool to prevent rotation of said first body member when said screw means is being applied or removed.

* * * * *